US010552263B2

(12) United States Patent
Zhang et al.

(10) Patent No.: US 10,552,263 B2
(45) Date of Patent: Feb. 4, 2020

(54) SYSTEM RUNNING METHOD AND INTELLIGENT TERMINAL

(71) Applicant: Huawei Technologies Co., Ltd., Shenzhen, Guangdong (CN)

(72) Inventors: Xun Zhang, Shenzhen (CN); Laifa Zhang, Shenzhen (CN); Yakun Wang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 170 days.

(21) Appl. No.: 15/727,431

(22) Filed: Oct. 6, 2017

(65) Prior Publication Data

US 2018/0032401 A1 Feb. 1, 2018

Related U.S. Application Data

(63) Continuation of application No. PCT/CN2015/093341, filed on Oct. 30, 2015.

(30) Foreign Application Priority Data

Apr. 8, 2015 (CN) .......................... 2015 1 0161894

(51) Int. Cl.
*G06F 11/00* (2006.01)
*G06F 11/14* (2006.01)
*G06F 11/07* (2006.01)

(52) U.S. Cl.
CPC .......... *G06F 11/1415* (2013.01); *G06F 11/07* (2013.01); *G06F 11/1464* (2013.01); *G06F 11/1469* (2013.01)

(58) Field of Classification Search
CPC ............... G06F 11/1415; G06F 11/143; G06F 11/0742; G06F 9/4408
See application file for complete search history.

(56) References Cited

U.S. PATENT DOCUMENTS 9,436,533 B2 * 9/2016 Hermany ............ G06F 11/0742
9,697,010 B2 * 7/2017 Paul ........................ G06F 9/441
(Continued)

FOREIGN PATENT DOCUMENTS

CN       1595368 A       3/2005
CN     102202075 A       9/2011
(Continued)

OTHER PUBLICATIONS

Machine Translation and Abstract of Korean Publication No. KR20130127629, Nov. 25, 2013, 14 pages.
(Continued)

*Primary Examiner* — Christopher S McCarthy
(74) *Attorney, Agent, or Firm* — Conley Rose, P.C.

(57) ABSTRACT

A system running method applied to an intelligent terminal is provided. The intelligent terminal includes a first system and a second system. The second system can implement a call function and/or a short message service function, and a function that can be implemented by the first system includes a function that can be implemented by the second system. The method includes: starting the first system and the second system, where an operation screen of the first system is visible to a user; detecting a running status of the first system; and when it is detected that the first system is faulty, terminating running of the first system, and switching to an operation screen of the second system disclosure.

22 Claims, 9 Drawing Sheets

(56) References Cited

U.S. PATENT DOCUMENTS

| | | |
|---|---|---|
| 2004/0039950 A1 | 2/2004 | Okamoto et al. |
| 2004/0153724 A1* | 8/2004 | Nicholson ........... G06F 11/0709 714/6.11 |
| 2004/0153834 A1 | 8/2004 | Oshima et al. |
| 2006/0227806 A1 | 10/2006 | Tseng |
| 2011/0016302 A1* | 1/2011 | Amou ................ G06F 11/1417 713/2 |
| 2011/0138389 A1 | 6/2011 | Molnar et al. |
| 2012/0159144 A1 | 6/2012 | Sengupta et al. |
| 2012/0226740 A1* | 9/2012 | Nath .................... H04L 67/125 709/203 |
| 2012/0226925 A1 | 9/2012 | Wang et al. |
| 2013/0018977 A1 | 1/2013 | Peng |
| 2014/0065958 A1* | 3/2014 | Yao ...................... H04B 5/0031 455/41.1 |
| 2014/0149358 A1 | 5/2014 | Aphale et al. |
| 2015/0277934 A1* | 10/2015 | Zhang .................... G06F 9/441 713/2 |
| 2017/0280437 A1* | 9/2017 | Xu .......................... G06F 11/30 |
| 2018/0088963 A1* | 3/2018 | Arora ........................ G06F 8/65 |

FOREIGN PATENT DOCUMENTS

| | | |
|---|---|---|
| CN | 102420911 A | 4/2012 |
| CN | 103391374 A | 11/2013 |
| CN | 104093220 A | 10/2014 |
| CN | 104142859 A | 11/2014 |
| CN | 104156273 A | 11/2014 |
| CN | 104156277 A | 11/2014 |
| CN | 104794014 A | 7/2015 |
| EP | 2034403 A1 | 3/2009 |
| JP | 2001-101033 A | 4/2001 |
| JP | 2003-208314 A | 7/2003 |
| JP | 2007-004599 A | 1/2007 |
| JP | 2008-234420 A | 10/2008 |
| JP | 2014-059733 A | 4/2014 |
| KR | 20130127629 A | 11/2013 |
| KR | 20150033505 A | 4/2015 |

OTHER PUBLICATIONS

Machine Translation and Abstract of Korean Publication No. KR20150033505, Apr. 1, 2015, 59 pages.
Foreign Communication From a Counterpart Application, Korean Application No. 10-2017-7031340, Korean Notice of Allowance dated Aug. 6, 2019, 3 pages.
Foreign Communication From a Counterpart Application, Chinese Application No. 201510161894.7, Chinese Search Report dated Aug. 30, 2019, 2 pages.
Foreign Communication From a Counterpart Application, Chinese Application No. 201510161894.7, Chinese Office Action dated Sep. 4, 2019, 7 pages.

\* cited by examiner

SYSTEM RUNNING METHOD AND INTELLIGENT TERMINAL

This application is a continuation of International Application No. PCT/CN2015/093341, filed on Oct. 30, 2015, which claims priority to Chinese Patent Application No. 201510161894.7, filed on Apr. 8, 2015. The disclosures of the aforementioned applications are hereby incorporated by reference in their entireties.

TECHNICAL FIELD

Embodiments of the present disclosure relate to the communications field, and more, to a system, running method and an intelligent terminal.

BACKGROUND

A smartphone (smartphone or smart phone) is a mobile phone that has a separate mobile operating system, on which an application program (APP) such as application software and a game may be installed to extend a function of the mobile phone, and whose computing capability and function are superior to those of a mobile phone with a conventional function.

An initial smartphone is a combination of a personal digital-assistant (PDA) and a mobile phone. Later, functions of a portable media player, an auto-focus digital camera, a pocket video camera, a Global Positioning System (GPS) navigator, and the like are gradually added to the smartphone, so that the smartphone becomes a mobile device with diversified functions. Many smartphones further have high-resolution touchscreens and web browsers to display standard web pages and optimized mobile web pages. The smartphones can further implement high-speed data access by using Wi-Fi and mobile broadband. In recent years, as a mobile APP market and mobile commerce develop, more people choose to use the smartphones.

Mobile operating systems of the smartphone include an Android (Android) system of Google, an iOS (iPhone Operation System) system, of Apple, a Windows Phone system of Microsoft, a Symbian (Symbian) system of Nokia, a BlackBerry OS (operating system) system of BlackBerry, a Bada system of Samsung, a WebOS system of HP, and some other embedded Linux systems.

The smartphone has a separate mobile operating system that can be upgraded and replaced by using a specific method. As a result, it is possible that the mobile operating system, is destroyed. In a process of using the mobile phone, system software of the mobile phone may also be destroyed due to various reasons. Consequently, the mobile phone cannot be normally used.

SUMMARY

Embodiments of the present disclosure provide a system running method applied to an intelligent terminal. The intelligent terminal includes a running first system, and a running second system. When the first system, is faulty, the intelligent terminal can switch to the second system, so as to ensure normal use of the intelligent terminal.

According to a first aspect, a system running method is provided, where the method is applied to an intelligent terminal, the intelligent terminal includes a first system and a second system, a function that can be implemented by the second system includes at least one of a call function or a short message service function, a function, that can be implemented by the first system includes the function that can be implemented by the second system, and the method includes:

starting the first system and the second system, where an operation screen of the first system is visible to a user, and an operation screen of the second system is invisible to the user;

detecting a running status of the first system; and when it is detected that the first system is faulty, terminating running of the first system, and switching to the operation screen of the second system.

With reference to the first aspect, in a first possible implementation of the first aspect, the intelligent terminal further includes a third system, a function that can be implemented by the third system includes at least one of the call function or the short message service function, and the method further includes:

detecting a running status of the second system; and terminating running of the second system and starting the third system, when it is detected that the second system is faulty.

With reference to the first aspect, in a second possible implementation of the first aspect, the intelligent terminal further stores a system image file of the second system, and the method further includes:

detecting a running status of the second system;

when it is detected that the second system is faulty, terminating running of the second system, and restoring the second system by using the system image file; and if the restoration succeeds, starting the restored second system.

With reference to the second possible implementation of the first aspect, in a third possible implementation of the first aspect, the intelligent terminal further includes a third system, a function that can be implemented by the third system includes at least one of the call function or the short message service function, and the method further includes:

if the restoration fails, starting the third system.

With reference to the first aspect or any one of the foregoing possible implementations of the first aspect, in a fourth possible implementation of the first aspect, the first system includes an application program installed by the user; or the first system includes system software and an application program, that are installed by the user.

With reference to any one of the foregoing possible implementations of the first aspect, in a fifth possible implementation of the first aspect, the method further includes:

receiving a restoration instruction that is of the user and that is for the second system; and restoring the second system according to the restoration instruction.

With reference to the fifth possible implementation of the first aspect, in a sixth possible implementation of the first aspect, the function that can be implemented by the third system further includes a network connection function; and the restoring the second system according to the restoration instruction includes:

according to the restoration instruction, obtaining network connection information and connecting to a network;

downloading a system software restoration package by using the network; and restoring the second system by using the system software restoration package.

With reference to the sixth possible implementation of the first aspect, in a seventh possible implementation of the first aspect, the method further includes:

restoring the first system by using the system software restoration package; or restoring the first system by using the restored second system.

With reference to any one of the foregoing possible implementations of the first aspect, in an eighth possible implementation of the first aspect, the intelligent terminal further includes a system, watchdog module and a system startup management module;

the detecting a running status of the second system includes:

detecting the running status of the second system by using a watchdog counter of the system watchdog module; and the terminating running of the second system and starting the third system, when it is detected that the second system is faulty includes:

when overflow occurs on the watchdog counter of the system watchdog module, sending a reset signal to the system startup management module; and after the system startup management module receives the reset signal, terminating running of the second system, and starting the third system.

With reference to the first aspect or any one of the foregoing possible implementations of the first aspect, in a ninth possible implementation of the first aspect, the method further includes:

restoring the first system by using the second system or a system image file stored in the intelligent terminal.

With reference to the first aspect or any one of the foregoing possible implementations of the first aspect, in a tenth possible implementation of the first aspect, the starting the first system and the second system includes: simultaneously starting the first system and the second system by using a virtualization technology.

With reference to the first aspect or any one of the foregoing possible implementations of the first aspect, in an eleventh possible implementation of the first aspect, multiple systems included in the intelligent terminal are obtained by means of virtualization configuration.

According to a second aspect, an intelligent terminal is provided, where the intelligent terminal includes a first system and a second system, a function that can be implemented by the second system includes at least one of a call function or a short message service function, and a function that can be implemented by the first system includes the function that can be implemented by the second system; and the intelligent terminal includes:

a startup unit, configured to start the first system and the second system, where an operation screen of the first system is visible to a user, and an operation screen of the second system is invisible to the user;

a detection unit, configured to detect a running status of the first system started by the startup unit; and a switching unit, configured to: when the detection unit detects that the first system is faulty, terminate running of the first system, and switch to the operation screen of the second system started by the startup unit.

With reference to the second aspect, in a first possible implementation of the second aspect, the intelligent terminal further includes a third system, and a function that can be implemented by the third system includes at least one of the call function or the short message service function;

the detection unit is further configured to detect a running status of the second system; and the startup unit is further configured to: when the detection unit detects that the second system is faulty, terminate running of the second system, and start the third system.

With reference to the second aspect, in a second possible implementation of the second aspect, the intelligent terminal further stores a system image file of the second system;

the detection unit is further configured to detect a running status of the second system;

the startup unit is further configured to: when it is detected that the second system is faulty, terminate running of the second system, and restore the second system by using the system image file; and the startup unit is further configured to: if the restoration succeeds, start the restored second system.

With reference to the second possible implementation of the second aspect, in a third possible implementation of the second aspect, the intelligent terminal further includes a third system, and a function that can be implemented by the third system includes at least one of the call function or the short message service function; and the startup unit is further configured to: if the restoration fails, start the third system.

With reference to the second aspect or any one of the second aspect or the foregoing possible implementations of the second aspect, in a fourth possible implementation of the second aspect, the first system includes an application program installed by the user; or the first system includes system software and an application program, that are installed by the user.

With reference to any one of the foregoing possible implementations of the second aspect, in a fifth possible implementation, of the second, aspect, the intelligent terminal further includes: a receiving unit and a restoration unit, where the receiving unit is configured to receive a restoration instruction that is of the user and that is for the second system; and the restoration unit is configured to restore the second system according to the restoration instruction received by the receiving unit.

With reference to the fifth possible implementation of the second aspect, in a sixth possible implementation of the second aspect, the function that can be implemented by the third system further includes a network connection function, and the restoration unit is configured to:

according to the restoration instruction, obtain network connection information and connect to a network;

download a system software restoration package by using the network; and restore the second system by using the system software restoration package.

With reference to the sixth possible implementation of the second aspect, in a seventh possible implementation of the second aspect, the restoration unit is further configured to:

restore the first system by using the system software restoration package; or restore the first system by using the restored second system.

With reference to any one of the foregoing possible implementations of the second aspect, in an eighth possible implementation of the second aspect, the intelligent terminal further includes a system watchdog module and a system startup management module;

the detection unit is configured to detect the running status of the second system by using a watchdog counter of the system watchdog module;

the switching unit is configured to: when overflow occurs on the watchdog counter of the system watchdog module, send a reset signal to the system startup management module; and after the system startup management module receives the reset signal, running of the second system is terminated, and the third system is started.

With reference to the second aspect, in a ninth possible implementation of the second aspect, the intelligent terminal further includes: a restoration unit, configured to restore the first system by using the second system or a system image file stored in the intelligent terminal.

With reference to the second aspect or any one of the foregoing possible implementations of the second aspect, in a tenth possible implementation of the second aspect, the startup unit is configured to simultaneously start the first system and the second system by using a visualization technology.

With reference to the second aspect or any one of the foregoing possible implementations of the second aspect, in an eleventh possible implementation of the second aspect, multiple systems included in the intelligent terminal are obtained by means of virtualization configuration.

In the embodiments of the present disclosure, the intelligent terminal includes the running first system and the running second system. When the first system is faulty, the intelligent terminal can switch to the second system, and the second system provides the at least one of the call function or the short message service function, so as to ensure normal use of the intelligent terminal. In addition, because the second system and the first system simultaneously run, the system switching requires a relatively short time, so as to implement quick switching, and improve user experience.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure.

It should be noted that an intelligent terminal in the embodiments of the present disclosure is a terminal that has a call function and/or a short message service function. Herein, the call function and/or the short message service function may be implemented based on a subscriber identity module (SIM) card installed in the intelligent terminal.

The SIM card may be a standard SIM card, a micro-SIM card, or a nano-SIM card. This is not limited in the present disclosure. In addition, the SIM card also has a storage function. For details, refer to descriptions about a SIM in the prior art. Details are not described herein.

For example, the intelligent terminal may be a smartphone. Without loss of generality, subsequent embodiments of the present disclosure are described by using a smartphone as an example.

In the embodiments of the present disclosure, system software of a smartphone is a mobile operating system of the mobile phone and application software pre-installed by a mobile phone manufacturer. For example, the application software pre-installed by the manufacturer is a calculator, a calendar, a recorder, or the like. It may be understood that the system software can implement a call function and/or a short message service function.

It should be noted that the application software pre-installed by the manufacturer may further include some other application programs (APP), for example, may include APPs such as a browser, WeChat, QQ, and Taobao. This is not limited in the present disclosure.

Based on the system software, a user may install an application program (APP) in the smartphone. In this way, a complete software system in the smartphone can be formed, and various functions of the smartphone can be implemented.

Generally, the smartphone includes a built-in memory that may be a memory that is configured to store application software and data. In addition, even if the mobile phone is powered off, content stored in the memory is not lost. The built-in memory may be similar to a hard disk in a computer (or referred to as a computer). In the smartphone, the built-in memory may be divided into multiple partitions, such as a system partition, a data partition, and another specific partition that are separately used to store content of different types.

In addition, a secure digital (SD) card may be installed in the smartphone. The SD card may also be referred to as a secure digital memory card. The SD card is a memory card that is widely applied to a portable device, such as a digital camera and a smartphone.

It may be understood that, in the embodiments of the present disclosure, the smartphone is a portable mobile terminal.

Figure 1:
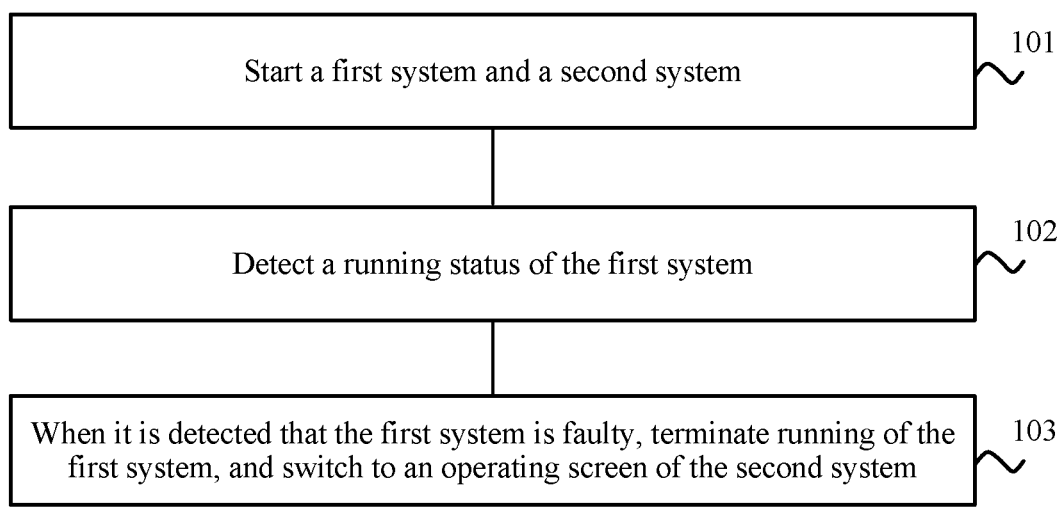
FIG. 1 is a flowchart of a system running method according to an embodiment of the present disclosure.

FIG. 1 is a flowchart of a system running method according to an embodiment of the present disclosure. The method shown in FIG. 1 is applied to an intelligent terminal. The intelligent terminal includes a first system and a second system. A function that can be implemented by the second system includes at least one of a call function or a short message service function, and a function that can be implemented by the first system includes the function that can be implemented by the second system. The method includes the following steps:

Step 101: Start the first system and the second system, where an operation screen of the first system is visible to a user, and an operation screen of the second system is invisible to the user.

Step 102: Detect a running status of the first system.

Step 103: When it is detected that the first system is faulty, terminate running of the first system, and switch to the operation screen of the second system.

In this embodiment of the present disclosure, the intelligent terminal includes the first system and the second system that simultaneously run. When the first system is faulty, the intelligent terminal can switch to the second system, and the second system provides the at least one of the call function or the short message service function, so as to ensure normal use of the intelligent terminal. In addition, because the second system and the first system, simultaneously run, the system switching requires a relatively short time, so as to implement quick switching, and improve user experience.

It should be rioted that, in this embodiment of the present disclosure, the intelligent terminal may already include the first system and the second system at delivery. The first system and the second system may be obtained by means of virtualization configuration. In addition, the first system and the second system, that are included in the intelligent terminal both include system software at delivery. As mentioned above, for a smartphone, the system software includes an operating system, of the mobile phone and application software pre-installed by a manufacturer.

In other words, for the user, the intelligent terminal in an initial state (that is, a delivery state of the intelligent terminal purchased by the user) includes the first system and the second system. The function that can be implemented by the first system is the same as the function that can be implemented by the second system. The function that can be implemented depends on the system software installed at delivery, and includes at least the call function and/or the short message service function.

It should be understood that, in this embodiment of the present disclosure, at a specific moment, there can be only one system visible to the user at most. That is, if the first system is visible to the user, the second system is certainly invisible to the user. If the second system is visible to the user, the first system is certainly invisible to the user.

Figure 2:
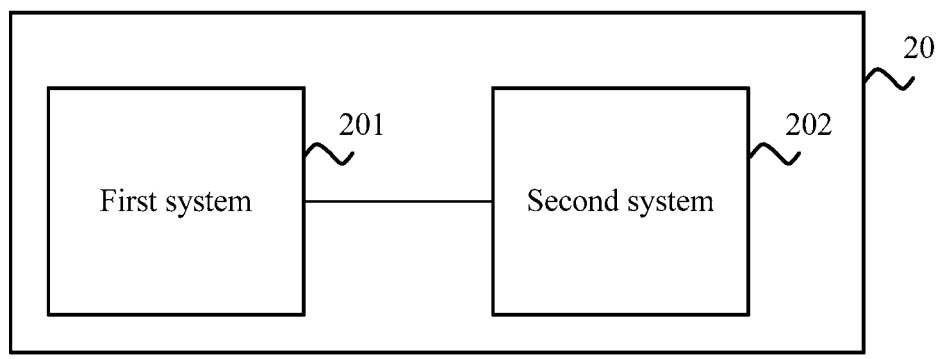
FIG. 2 is a schematic structural diagram, of a system of an intelligent terminal according to an embodiment of the present disclosure.

Optionally, in an embodiment, as shown in FIG. 2, the intelligent terminal 20 may include the first system 201 and the second system 202.

In addition, in this embodiment of the present disclosure, the first system 201 is separated from the second system 202. A meaning of the separation is that the user can perform an operation on the first system 201, for example, an operation such as editing or deleting, but the user cannot perform any operation on the second system 202.

That is, the user cannot perform an operation such as editing or deleting on the system software in the second system 202. The user can perform an operation such as editing or deleting on the system software in the first system 201.

Optionally, the first system 201 may include an application program installed by the user, or the first system 201 may include system software and an application program that are installed by the user.

For example, based on existing system software in the first system 201, the user may further install an APP.

For another example, the user may modify the existing system software in the first system 201.

For another example, the user may format the first system. 201, and then, the user reinstalls the first system 201 by using a reinstallation package. The reinstallation package may be a complete system, and may include an operating system (OS), a user interface (UI), and an application program (APP). After the reinstallation, the user can still install an expected APP or the like.

Optionally, in step 101, the first system and the second system, may be simultaneously started by using a virtualization technology.

For example, step 101 may be performed when the intelligent terminal is powered on. It should be noted that the simultaneous startup herein cannot be considered as a limitation on time. For example, when the intelligent terminal is powered on, the first system is first started, and then, the second system is immediately started. This should, also be considered as the simultaneous startup in this embodiment of the present disclosure.

In addition, that the operation screen of the second system is invisible to the user in step 101 may be considered as that the second system runs in a background.

It may be understood that even though the intelligent terminal 20 simultaneously starts the first system 201 and the second system. 202, the second system 202 running in the background does not occupy excessive resources, excessive space, or the like because the second system 202 can implement relatively few functions (including only functions at delivery), and therefore, has little impact on running of the first system 201.

Optionally, step 102 may include: detecting, by the second system, the running status of the first system. That is, the second system has a detection (or monitoring) function.

It should be noted that, in this embodiment of the present disclosure, the running status of the first system may also be detected by another module. This is not limited in the present disclosure.

Optionally, a reason for a fault occurring on the first system in step 103 may be as follows:

(1). An APP installed in the first system by the user has an unreliable source. A virus carried in the APP causes the fault in an operating system of the first system.

(2). The user installs a pirated operating system in the first system. Instability of the pirated operating system causes the fault.

Alternatively, there may be another reason for the fault occurring on the first system. This is not limited in the present disclosure.

It may be understood that the switching to the operation screen of the second system in step 103 may be: switching the running second system from the background to a foreground, and presenting the operation screen of the second system on a display of the intelligent terminal. For example, the display is a touch liquid crystal display (LCD).

In this embodiment of the present disclosure, because the second system is in a startup state, quick switching can be implemented in step 103, so as to ensure that a function provided by the second system is quickly used.

Optionally, in an embodiment, after step 103, a process of restoring the first system may be further included.

Optionally, the first system may be restored to a delivery state by means of system restoration.

Optionally, the first system may be restored by using the second system or a system image file stored in the intelligent terminal. For example, when a service is not busy, the user may format the faulty first system, and then copy all system software of the second system into the first system, to complete restoration of the first system. For another example, the user may restore the first system by using the system image file stored in the intelligent terminal. The system image file herein may be referred to as a system image file of the second system, or may be referred to as a system image file of the first system at delivery.

Alternatively, the user may format the faulty first system, then install a new operating system, and further installs an APP or the like.

Alternatively, the user may restore the first system to a delivery state by means of system restoration.

Optionally, in another embodiment, the intelligent terminal further includes a third system. A function that can be implemented by the third system includes at least one of the call function or the short message service function. After step 103, the method may further include:

detecting a running status of the second system; and terminating running of the second system and starting the third system, when it is detected that the second system is faulty.

The terminating running of the second system and starting the third system is: terminating running of the second system and starting the third system, where the third system is visible to the user. It may be understood that, because running of the first system is terminated in step 103, and running of the second system is also terminated herein, after the third system is started, the third system is visible to the user.

Figure 3:
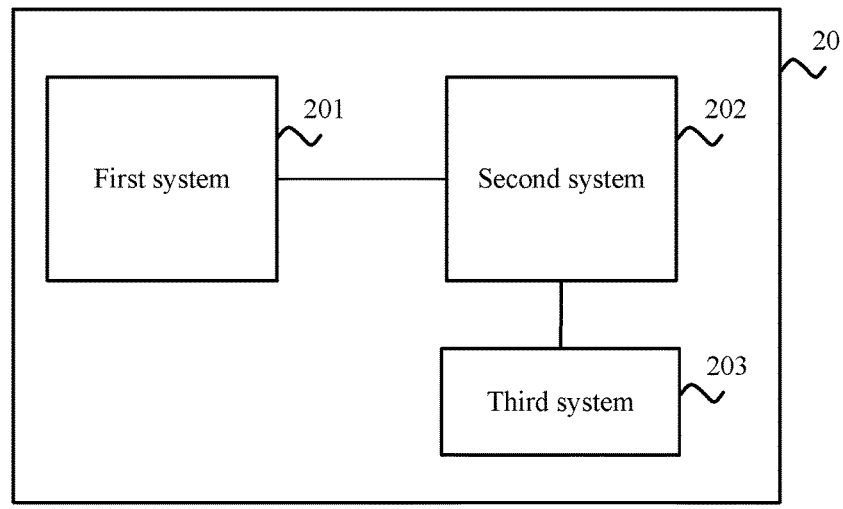
FIG. 3 is a schematic structural diagram of a system, of an intelligent terminal according to another embodiment of the present disclosure.

As shown in FIG. 3, the intelligent terminal 20 includes the first system 201, the second system 202, and the third system 203. Herein, the first system 201, the second system 202, and the third system 203 may be obtained by means of virtualization configuration.

In this embodiment of the present disclosure, when the intelligent terminal is powered on, the first system 201 and the second system 202 are simultaneously started, but the third system 203 is not started.

Optionally, a function implemented by the third system 203 may include only the call function and/or the short message service function. Herein, the third system 203 may be a minimum system, and is used as a cold standby of the second system 202.

In an example, the second system 202 may have a monitoring function; and is used to: detect the running status of the second system 202, and when it is detected that the second system 202 is faulty, send a startup instruction to the third system 203 to start the third system 203.

Figure 4:
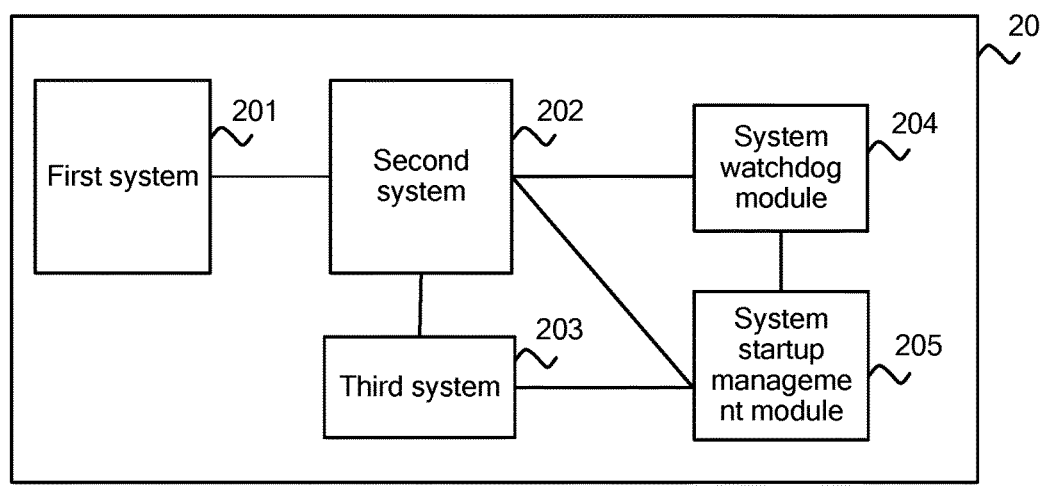
FIG. 4 is a schematic structural diagram, of a system of an intelligent terminal according to another embodiment of the present disclosure.

In another example, a system watchdog module and a system startup management module may be used to implement the detection. As shown in FIG. 4, the intelligent terminal 20 further includes a system watchdog module 204 and a system startup management module 205. Correspondingly, the detecting a running status of the second system includes: detecting the running status of the second system by using a watchdog counter of the system watchdog module 204.

The terminating running of the second system, and starting the third system, when it is detected that the second system is faulty includes: when overflow occurs on the watchdog counter of the system watchdog module 204, sending a reset signal to the system startup management module 205; and after the system startup management module 205 receives the reset signal, terminating running of the second system 202, and starting the third system 203.

After the second system 202 is started, regularly servicing a watchdog is started. That is, the second system 202 regularly sends a watchdog servicing signal to the system watchdog module 204, and the second system 202 also regularly and periodically resets the watchdog. When the second system 202 is faulty, the second system 202 cannot regularly and periodically reset the watchdog. Consequently, the overflow occurs on the watchdog counter of the system watchdog module 204. Conversely, it may be understood that when the overflow occurs on the watchdog counter of the system watchdog module 204, the system watchdog module 204 may determine that the second system 202 is faulty. Further, the system watchdog module 204 sends a reset signal to the system startup management module 205, so that the system startup management module 205 can start the third, system 203.

For descriptions about principles of the system watchdog module 204 and the system startup management module 205, refer to a working principle of a system watchdog in the prior art. To avoid repetition, details are not described herein.

In this way, in the embodiment shown in FIG. 3 or FIG. 4, the intelligent terminal includes the third system that serves as the cold standby. Even if both the first system and the second system are faulty, a basic call function and/or a basic short message service function can be guaranteed, so that a service requirement of the user can be ensured, and user experience can be improved.

It may be learned that, in this embodiment of the present disclosure, function division of a software system of the intelligent terminal is optimized, performance of a key application can be improved, and a user experience effect can be improved.

Figure 5:
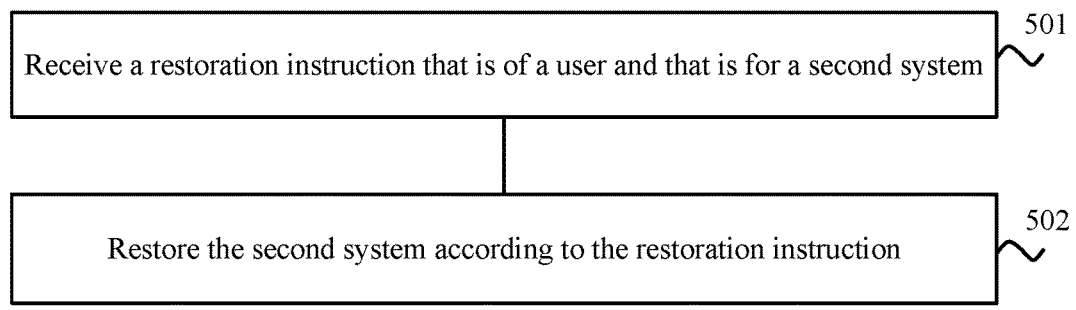
FIG. 5 is a flowchart of a system restoration method according to an embodiment of the present disclosure.

Further, in the embodiment shown in FIG. 3 or FIG. 4, after the third system is started, the user may further start restoration of the first system 201. As shown in FIG. 5, the method may include the following steps:

Step 501: Receive a restoration instruction that is of the user and that is for the second system.

Step 502: Restore the second system according to the restoration instruction.

For example, when a service is not busy, the user may restore a system when a network is in a relatively good state. For example, when the third system 203 is started, a "Restore" button may be presented on a screen of the intelligent terminal. In this way, a tap performed by the user on the "Restore" button may be considered as a restoration instruction of the user.

For example, it is assumed that the function that can be implemented by the third system 203 includes the call function and the short message service function. When the third system 203 is started, an operation screen of the intelligent terminal may be displayed as FIG. 6, including: a phone button 602, used for answering or making a call; a short message service button 603, used for sending or receiving a short message service message; a contacts button 604, used for checking a stored contact; and a restore button 605, used for performing step 501. In addition, an area 601 in FIG. 6 may be used for displaying an operator, time, a battery level, signal strength, and the like.

Figure 6:
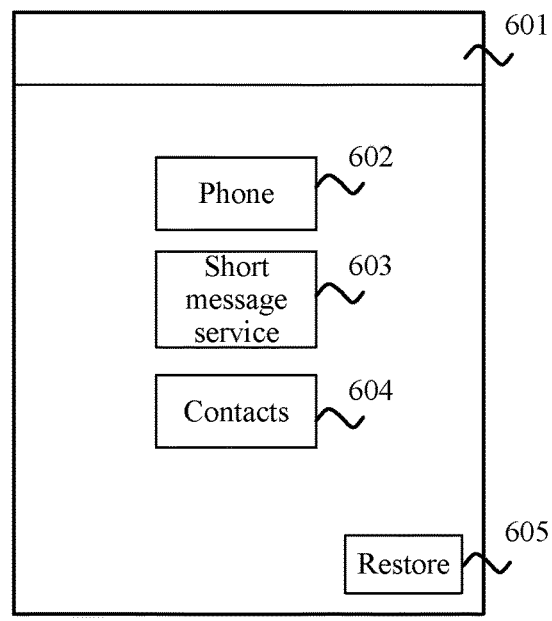
FIG. 6 is a schematic diagram of an operation screen of a third system according to an embodiment of the present disclosure.

Optionally, the screen shown in FIG. 6 may also be referred to as an emergency call screen.

It should be noted that FIG. 6 is only an example description of an operation screen used when the third system runs. Actually, more content (for example, a calculator, settings, a network connection, and the like are further included) or less content (for example, contacts are not included) may be displayed. This is not limited in the present disclosure.

Optionally, the function implemented by the third system may further include a network connection function. Correspondingly, step 502 may include: according to the restoration instruction, obtaining network connection information and connecting to a network; downloading a system software restoration package by using the network; and restoring the second system by using the system software restoration package.

Optionally, after step 502, the intelligent terminal may present an operation screen of the restored second system.

Figure 7:
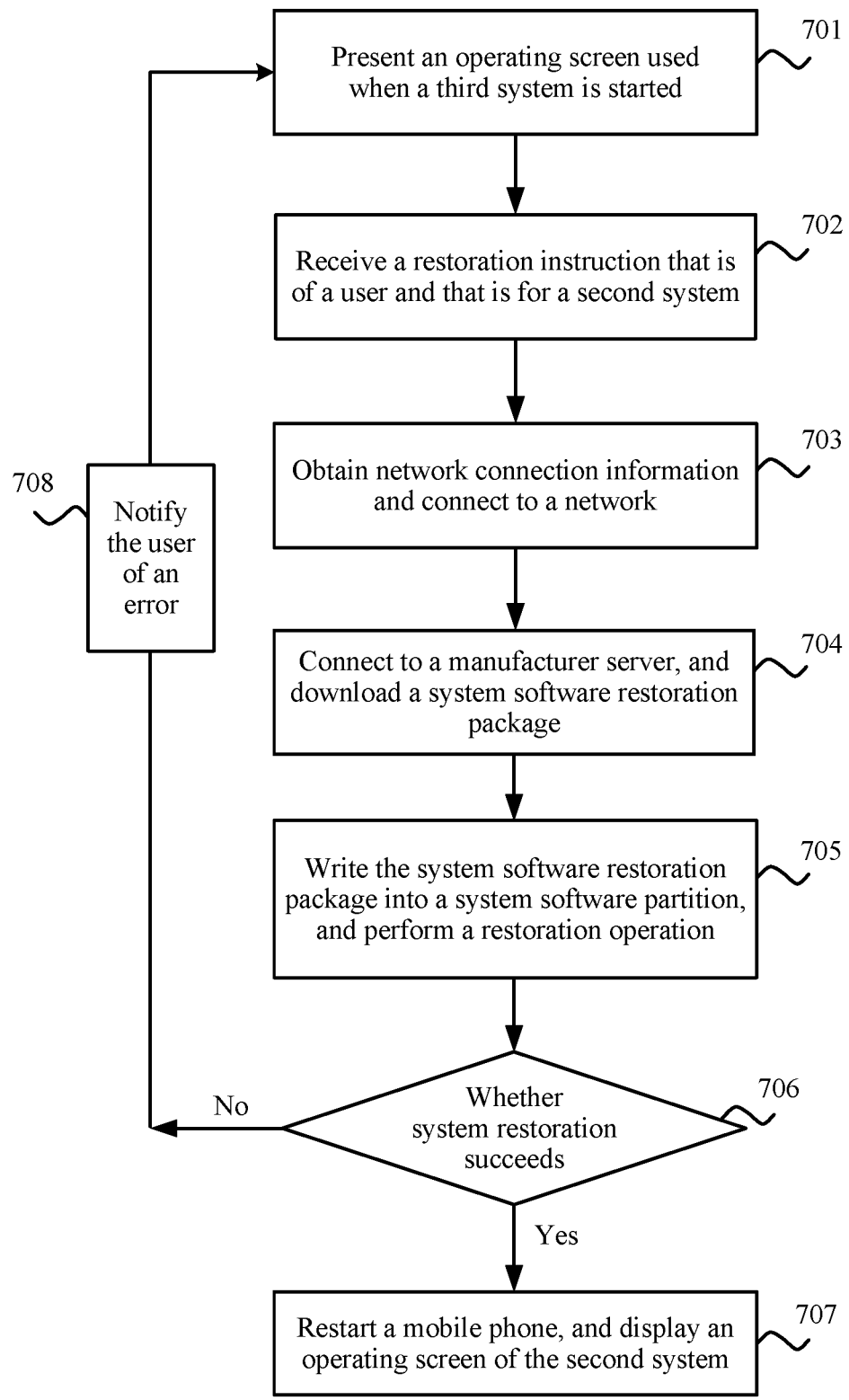
FIG. 7 is a flowchart of a system restoration method according to another embodiment of the present disclosure.

In an example, as shown in FIG. 7, FIG. 7 is a flowchart of a method for restoring a second system according to another embodiment of the present disclosure. The method shown in FIG. 7 includes the following steps.

Step 701: Present an operation screen used when the third system is started.

For example, the operation screen may be the operation screen shown in FIG. 6.

Step 702: Receive a restoration instruction that is of the user and that is for the second system.

For example, the restoration instruction may be a tap performed by the user on the "Restore" button on the screen shown in FIG. 6.

Alternatively, for example, the restoration instruction may be a tap performed by the user on the "Restore" button on the screen shown in FIG. 6, and a tap on a subsequently displayed "Yes" or "Confirm" button.

That is, after the user taps the "Restore" button on the screen shown in FIG. 6, the "Yes" (or "Confirm") button and a "No" (or "Cancel") button may be presented. The user may tap the "Yes" (or "Confirm") button, so that the intelligent terminal further performs step 703; or the user may tap the "No" (or "Cancel") button, so that intelligent terminal returns to step 701.

Step 703: Obtain network connection information and connect to a network.

For example, the intelligent terminal may read wireless network connection information of a specific partition of the intelligent terminal, and connect to a wireless network by using the wireless network connection information.

Herein, the wireless network connection information may be wireless network (Wi-Fi) configuration information used when the user normally uses the mobile phone, and is pre-stored in the specific partition of the intelligent terminal by using a system restoration framework. When the user changes the wireless network connection information, the system restoration framework is responsible for synchronizing, to the specific partition, new information obtained after the change. In this way, during system restoration, the intelligent terminal may automatically obtain the wireless network connection information without intervention of the user, so as to implement a one-button operation.

Optionally, after step 703, a wireless network connection screen, may be presented, and is used by the user to select one Wi-Fi for connection.

For another example, the intelligent terminal may read connection information of a wireless data service (for example, 3G, 4G, 5G, or the like) network from a SIM card, and connect to a data network.

Step 704: Connect, to a manufacturer server by using the network, and download a system software restoration package.

For example, the system software restoration package may be downloaded from the manufacturer server, and validity of the system software restoration package may be checked.

Step 705: Write the downloaded system software restoration package into a system software partition, and perform a restoration operation.

For example, if a built-in memory of the intelligent terminal includes multiple partitions, the downloaded system software restoration package may be written into a system partition.

The restoration operation herein is an operation of restoring the second system.

Step 706: If the system restoration succeeds, perform step 707; or if the system restoration fails, perform step 708.

Step 707: After the system, restoration succeeds, restart the mobile phone, and display the operation screen of the second system after the restarting.

Herein, after the system restoration succeeds, the mobile phone may be automatically restarted. Alternatively, after the system restoration succeeds, a dialog box pops up, and the mobile phone is restarted after confirmation performed by the user.

Step 708: After the system restoration fails, notify the user that the system restoration fails, and continue to present the operation screen used when the third system is started in step 701.

Optionally, after step 502, the method may further include: restoring the first system by using the restored second system. Alternatively, if the second system is restored by using the downloaded system software restoration package in step 502, after step 502, the method may include: restoring the first system by using the system software restoration package.

For a process of restoring the first system, refer to descriptions of the method for restoring the first system in the foregoing embodiment. To avoid repetition, details are not described herein again.

When the first system is restored, the operation screen of the first system may be presented. For example, after the first system is restored, the intelligent terminal may be restarted, and step 101 is performed. Further, the user may install an APP or the like in the running restored first system.

Figure 8:
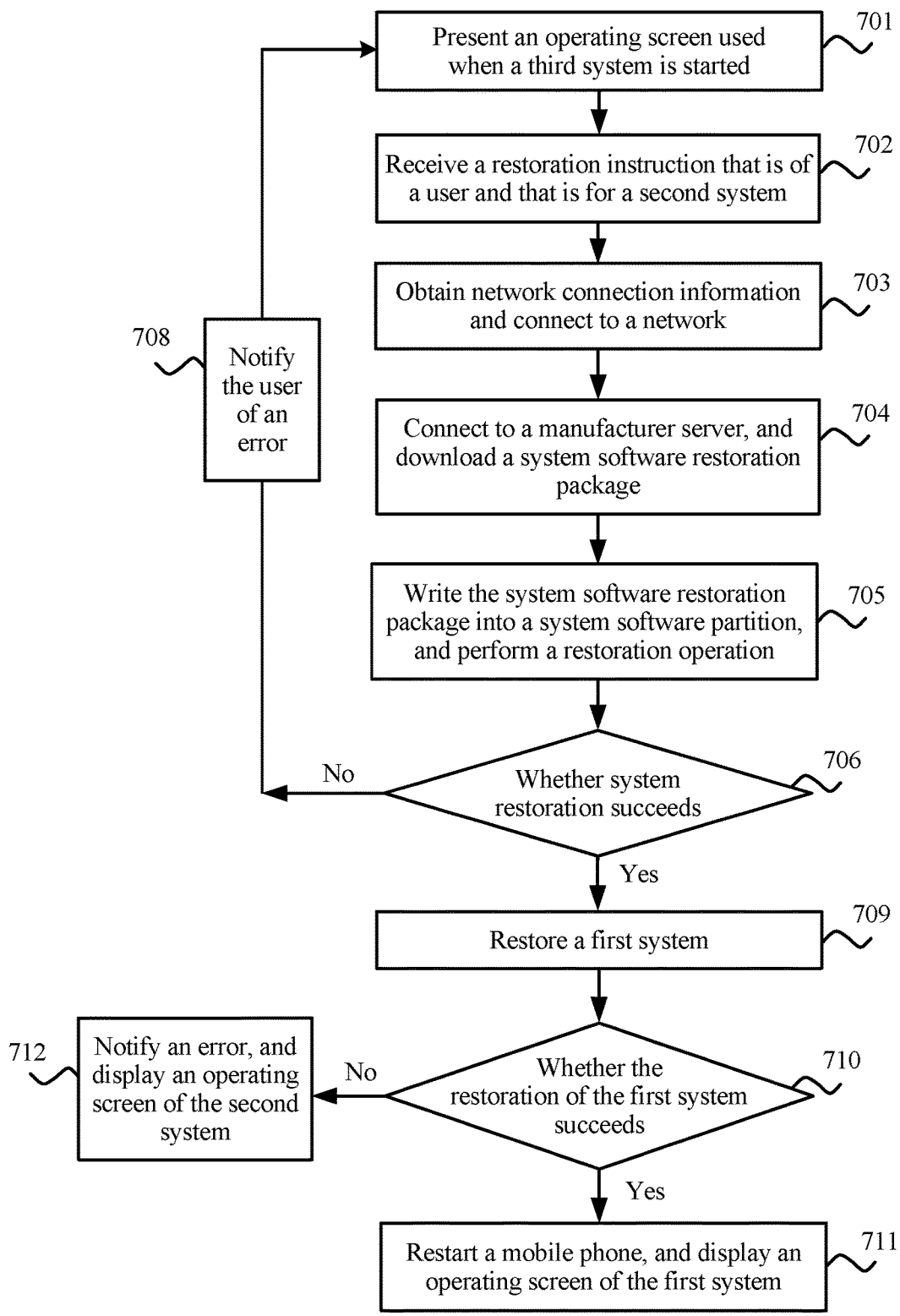
FIG. 8 is a flowchart of a system restoration method according to another embodiment of the present disclosure.

Correspondingly, in the embodiment shown in FIG. 7, if the restoration of the second system succeeds in step 706, as shown in FIG. 8, step 709 may be performed after step 706.

Step 709: Restore the first system.

For example, the first system may be restored by using the downloaded system software restoration package in step 704. Alternatively, the first system may be restored by using the restored second system in step 706.

Step 710: If the restoration of the first system succeeds, perform step 711; or if the restoration of the first system fails, perform step 712.

Step 711: After the restoration of the first system succeeds, restart the mobile phone, and display the operation screen of the first system after the restarting.

Herein, after the restoration of the first system succeeds, the mobile phone may be automatically restarted. Alternatively, after the restoration of the first system succeeds, a dialog box pops up, and the mobile phone is restarted after confirmation performed by the user.

Step 712: After the restoration of the first system fails, notify the user that the restoration of the first system fails; automatically restart the intelligent terminal, or restart the intelligent terminal by the user; and present the operation screen of the second system.

In this embodiment of the present disclosure, the user may determine an occasion for system restoration. In this way, basic communication of the user is not affected, and normal use performed by the user is ensured, so that user experience can be improved.

Optionally, in another embodiment, based on FIG. 2 or FIG. 3, the intelligent terminal 20 in this embodiment of the present disclosure may further store the system image file of the second system. After step 102 in FIG. 1, the method may further include: detecting a running status of the second system; when it is detected that the second system is faulty, terminating running of the second system, and restoring the second system by using the system image file; and if the restoration succeeds, starting the restored second system.

Further, if the restoration fails, the third system is started. Descriptions about the third system may be shown in FIG. 3.

It may be understood that the starting the restored second system is: presenting the operation screen of the restored second system.

Optionally, the system image file of the second system may be stored in a fourth system in the intelligent terminal 20. That is, based on FIG. 2 or FIG. 3, the intelligent terminal 20 in this embodiment of the present disclosure may further include a fourth system 206 that is separately shown in FIG. 9 and FIG. 10. The fourth system 206 includes the system image file of the second system 202, and the fourth system 206 is invisible to the user. Then, after step 102 in FIG. 1, the method may further include:

detecting, by the fourth system, the running status of the second system;

when the fourth system detects that the second system is faulty, terminating running of the second system, and restoring the second system by using the system image file; and if the restoration succeeds, starting the restored second system.

Figure 10:
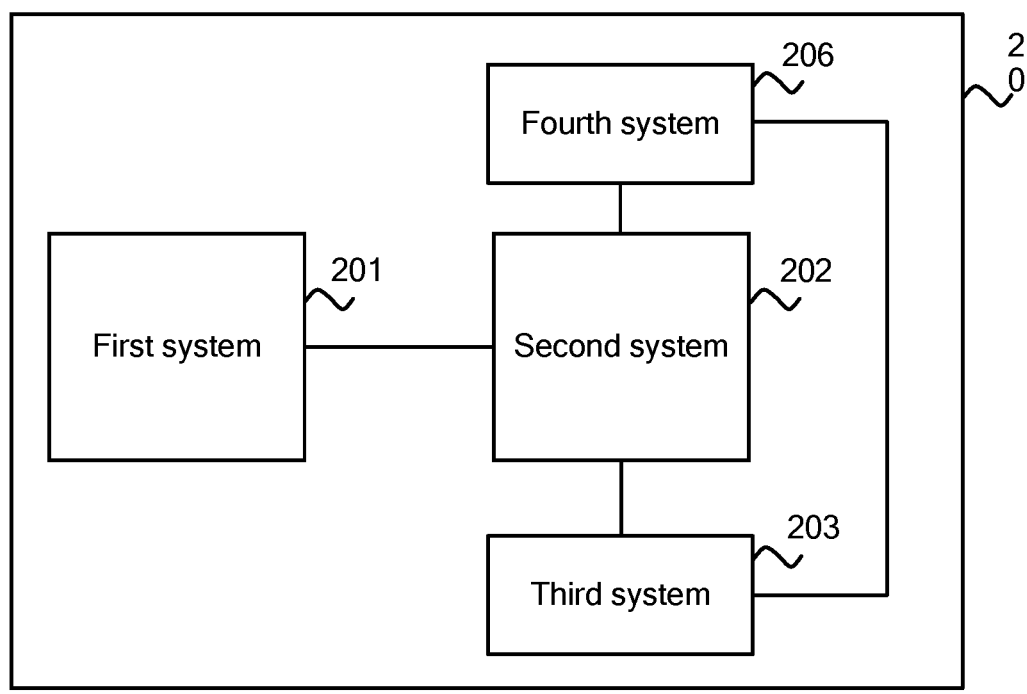
FIG. 10 is a schematic structural diagram of a system of an intelligent terminal according to smother embodiment of the present disclosure.

Further, for a scenario shown in FIG. 10, if the restoration fails, the third system is started.

It should be noted that, in this embodiment of the present disclosure, the fourth system 206 may be a function module, and the function module has a detection (or monitoring) function. In addition, the fourth system 206 is configured to detect the running status of the second system 202. That is, the fourth system 206 in this embodiment of the present disclosure may be different from the foregoing systems. The fourth system 206 may not include an operating system that has an operation screen.

The fourth system 206 may perform the detection function when the intelligent terminal 20 is in a startup state. Alternatively, the fourth system 206 performs the detection function provided that the intelligent terminal 20 is in a powered-on state.

Figure 11:
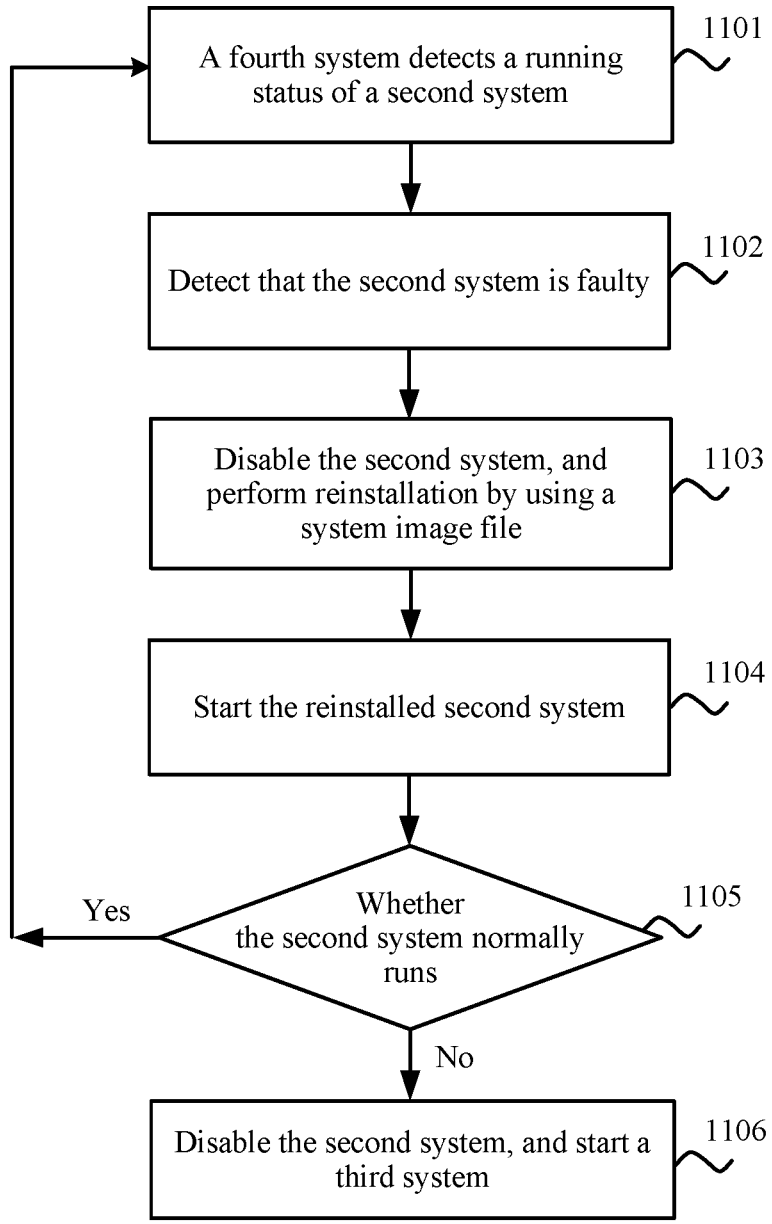
FIG. 11 is a flowchart of a system running method according to another embodiment of the present disclosure.

The fourth system 206 may regularly (or periodically) perform detection on the second system 202. The procedure may be shown in FIG. 11.

Step 1101: The fourth system 206 detects the running status of the second system 202.

Step 1102: The fourth system 206 detects that the second system 202 is faulty.

Figure 9:
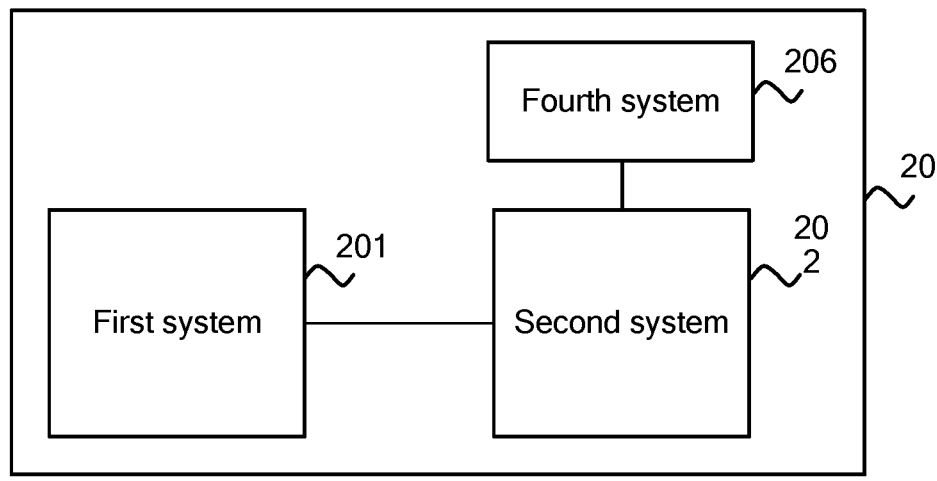
FIG. 9 is a schematic structural diagram of a system of an intelligent terminal according to another embodiment of the present disclosure.

It may be understood that, in the embodiments shown in FIG. 9 and FIG. 10, the intelligent terminal includes the fourth system 206 that has the detection function, to offload a processing capability of the second system 202. That is, the second system 202 does not need to perform detection, so as to improve a running capability of the second system 202.

Step 1103: When detecting that the second system 202 is faulty, the fourth system 206 disables the second system 202, and performs a reinstallation operation on the second system 202 by using the stored system image file of the second system.

In this embodiment of the present disclosure, the reinstallation is an operation of writing system software of the intelligent terminal into the built-in memory of the mobile phone to upgrade and restore software of the mobile phone.

It may be understood that, in step 1103, the process in which the fourth system 206 restores the second system 202 by using the system image file consumes an extremely short time. In this way, this has little impact on the user in terms of time, and can ensure that the user restores use of the intelligent terminal as quickly as possible.

Step 1104: After the reinstallation operation in step 1103 is completed, start the reinstalled second system 202.

Step 1105: Further determine whether the started reinstalled second system 202 in step 1104 normally runs.

If it is determined, in step 1105, that the started reinstalled second system 202 normally runs, step 1101 is performed then. That is, the second system 202 continues to normally run, and the fourth system 206 regularly or periodically performs detection on the second system 202.

If it is detected, in step 1105, that the started reinstalled second system 202 abnormally runs or is faulty, step 1106 is performed.

Step 1106: Disable the second system 202, and start the third system 203.

Further, for the intelligent terminal 20 shown in FIG. 9 or FIG. 10, when the third system 203 is in a running state, a process of restoring the second system 202 may also be included. A process of restoring the first system 201 may be further included. For the restoration process, refer to the methods described in the embodiments of FIG. 5 to FIG. 7. To avoid repetition, details are not described herein again.

Figure 12:
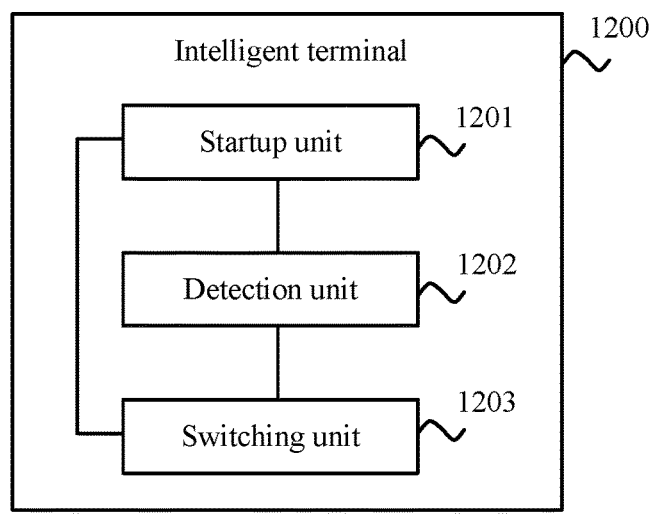
FIG. 12 is a structural block diagram of an intelligent terminal according to an embodiment of the present disclosure.

FIG. 12 is a structural block diagram of an intelligent terminal according to an embodiment of the present disclosure. The intelligent terminal 1200 shown in FIG. 12 may include a first system and a second system. A function that can be implemented by the second system includes at least one of a call function or a short message service function, and a function that can be implemented by the first system includes the function that can be implemented by the second system. This is shown in FIG. 2. In addition, the intelligent terminal 1200 may include a startup unit 1201, a detection unit 1202, and a switching unit 1203.

The startup unit 1201 is configured to start the first system and the second system. An operation screen of the first system is visible to a user, and an operation screen of the second system is invisible to the user.

The detection unit 1202 is configured to detect a running status of the first system started by the startup unit 1201.

The switching unit 1203 is configured to: when the detection unit 1202 detects that the first system is faulty, terminate running of the first system, and switch to the operation screen of the second system started by the startup unit 1201.

In this embodiment of the present disclosure, the intelligent terminal includes the first system and the second system that simultaneously run. When the first system is faulty, the intelligent terminal can switch to the second system, and the second system provides the at least one of the call function or the short message service function, so as to ensure normal use of the intelligent terminal. In addition, because the second system and the first system simultaneously run, the system switching requires a relatively short time, so as to implement quick switching, and improve user experience.

In this embodiment of the present disclosure, the function that can be implemented by the second system may further include a function of an APP pre-installed by a manufacturer.

Optionally, the first system may include an APP installed by the user. Alternatively, the first system may include system software and an APP that are installed by the user.

Optionally, in an embodiment, the intelligent terminal 1200 may further include a third system (as shown in FIG. 3). A function that can be implemented by the third system includes at least one of the call function or the short message service function. The detection unit 1202 is further configured to detect a running status of the second system. The startup unit 1201 is further configured to: when the detection unit 1202 detects that the second system is faulty, terminate running of the second system, and start the third system.

Optionally, in another embodiment, the intelligent terminal 1200 further stores a system image file of the second system. The detection unit 1202 is further configured to detect a running status of the second system. The startup unit 1201 is further configured to: when it is detected that the second system is faulty, terminate running of the second system, and restore the second system by using the system image file. The startup unit 1201 is further configured to: if the restoration succeeds, start the restored second system.

The system image file of the second system may be stored in a fourth system, that is, the intelligent terminal 1200 may include the fourth system (as shown in FIG. 9).

Optionally, in another embodiment, the intelligent terminal 1200 may include both the fourth system and a third system (as shown in FIG. 10). A function that can be implemented by the third system includes at least one of the call function or the short message service function. The startup unit 1201 is further configured to: if the restoration fails, start the third system.

Optionally, in another embodiment, the intelligent terminal 1200 may further include a receiving unit and a restoration unit. The receiving unit is configured to receive a restoration instruction that is of the user and that is for the second system. The restoration unit is configured to restore the second system according to the restoration instruction received by the receiving unit.

The restoration unit may be configured to: according to the restoration instruction, obtain network connection information and connect to a network; download a system software restoration package by using the network; and restore the second system by using the system software restoration package.

The restoration unit may be further configured to: restore the first system by using the system software restoration package; or restore the first system by using the restored second system.

Optionally, in another embodiment, the intelligent terminal 1200 may further include a system watchdog module and a system startup management module (as shown in FIG. 4). The detection unit 1202 is configured to detect the running status of the second system by using a watchdog counter of the system watchdog module. The switching unit 1203 is configured to: when overflow occurs on the watchdog counter of the system watchdog module, send a reset signal to the system startup management module. After the system startup management module receives the reset signal, running of the second system is terminated, and the third system is started.

Optionally, in another embodiment, the intelligent terminal 1200 may further include: a restoration unit, configured to restore the first system by using the second system or a system image file stored in the intelligent terminal.

Optionally, in another embodiment, the startup unit 1201 is configured to simultaneously start the first system and the second system by using a virtualization technology.

Optionally, in another embodiment, multiple systems included, in the intelligent terminal are obtained by means of virtualization configuration.

Optionally, the intelligent terminal 1200 in this embodiment of the present disclosure may be a mobile phone or a smartphone.

The intelligent terminal 1200 can implement each process implemented by the intelligent terminal in the foregoing method embodiment. To avoid repetition, details are not described herein again.

Figure 13:
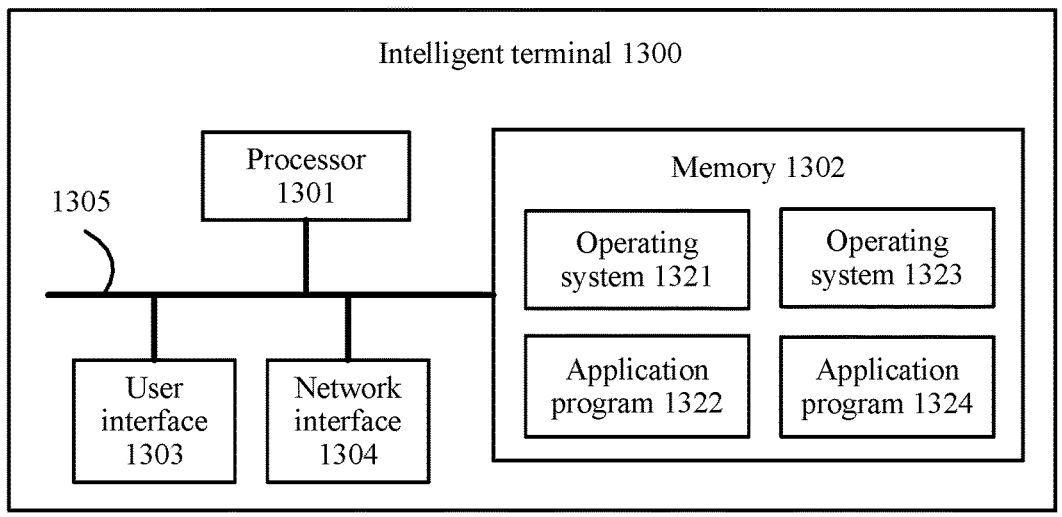
FIG. 13 is a structural block diagram of an intelligent terminal according to another embodiment of the present disclosure.

FIG. 13 is a structural block diagram of an intelligent terminal according to another embodiment of the present disclosure. The intelligent terminal 1300 shown in FIG. 13 includes at least one processor 1301, a memory 1302, at least one network interface 1304, and another user interface 1303. All components of the intelligent terminal 1300 are coupled together by using a bus system 1305, It may be understood that the bus system 1305 is configured to implement connection and communication between these components. In addition to a data bus, the bus system 1305 may include a power bus, a control bus, and a status signal bus. However, for clarity of description, various buses are marked as the bus system 1305 in FIG. 13.

The user interface 1303 may include a display, a keyboard, or a clicking device (for example, a mouse, a trackball (trackball), a touch panel, or a touchscreen).

It may be understood that the memory 1302 in this embodiment of the present disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. According to description that can be used as an example instead of a limitation, BAMs of many forms can be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). The memory 1302 in the system and the method that are described in this specification is to include but is not limited to these memories and a memory of any other proper type.

In some implementations, the memory 1302 stores the following elements: an executable module or a data structure, or a subset of an executable module or a data structure, or an extended set of an executable module or a data structure, that is, an operating system 1321 and an application program 1322, and an operating system 1323 and an application program 1324. In this embodiment of the present disclosure, the memory 1302 may store multiple operating systems. The multiple operating systems may be the same or different. For example, the operating system 1321 may be implemented by a user by means of reinstallation by using a reinstallation package.

The operating system 1321/1323 includes various system programs, for example, a framework layer, a kernel library layer, and a driver layer, and is configured to implement various basic services and process hardware-based tasks. The application program 1322/1324 includes various application programs, for example, a launcher (launcher), a media player (Media Player), and a browser (Browser), and is configured to implement various application services.

In this embodiment of the present disclosure, the memory 1302 may include a first system and a second system. A function that can be implemented by the second system includes at least one of a call function or a short message service function, and a function that can be implemented by the first system includes the function that can be implemented by the second system. For example, it may be assumed that the first system, includes the operating system 1321, and the second system includes the operating system 1323. The operating system 1323 may be an operating system pre-installed by a manufacturer. The operating system 1321 may be an operating system pre-installed by the manufacturer, or may be installed by the user by means of reinstallation by using a reinstallation package.

By invoking a program or an instruction stored in the memory 1302, the processor 1301 may be configured to: start the first system and the second system, where an operation screen of the first system is visible to the user, and an operation screen of the second system is invisible to the user; detect a running status of the first system; and when it is detected that the first system is faulty, terminate running of the first system, and switch to the operation screen of the second system.

In this embodiment of the present disclosure, the intelligent terminal includes the running first system and the running second system. When the first system is faulty, the intelligent terminal can switch to the second system, and the second system provides the at least one of the call function or the short message service function, so as to ensure normal use of the intelligent terminal. In addition, because the second system and the first system simultaneously run, the system switching requires a relatively short time, so as to implement quick switching, and improve user experience.

The methods disclosed in the foregoing embodiments of the present disclosure may be applied to the processor 1301, or implemented by the processor 1301. The processor 1301 may be an integrated circuit chip and has a signal processing capability. In an implementation process, the steps in the foregoing methods may be completed by using an integrated logic circuit of hardware in the processor 1301 or an instruction in a form of software. The processor 1301 may be a general purpose processor, a digital signal processor (DSP), an application-specific integrated circuit (ASIC), a field programmable gate array (FPGA) or another programmable logic device, a discrete gate or transistor logic device, or a discrete hardware assembly. The processor 1301 may implement or perform the methods, steps, and logical block diagrams disclosed in the embodiments of the present disclosure. The general purpose processor may be a microprocessor, or the processor may be any conventional processor, or the like. The steps of the methods disclosed with reference to the embodiments of the present disclosure may be directly performed and completed by a hardware decoding processor, or performed and completed by a combination of hardware and software modules in a decoding processor. The software module may be located in a mature storage medium in the field, for example, a random access memory, a flash memory, a read-only memory, a programmable read-only memory, an electrically-erasable programmable memory, or a register. The storage medium is located in the memory 1302. The processor 1301 reads information from the memory 1302, and completes the steps in the foregoing methods in combination with hardware of the processor 1301.

In this embodiment of the present disclosure, the function that can be implemented by the second system may further include a function of an APP pre-installed by a manufacturer.

Optionally, the first system may include an APP installed by the user. Alternatively, the first system may include system software and an APP that are installed by the user.

Optionally, in an embodiment, the intelligent terminal 1300 may further include a third system. A function that can be implemented by the third system includes at least one of the call function or the short message service function. The processor 1301 is further configured to: detect a running status of the second system; and when it is detected that the second system is faulty, terminate running of the second system, and start the third system.

Optionally, in another embodiment, the intelligent terminal 1300 further includes a fourth system. The fourth system includes a system image file of the second system, and the fourth system is invisible to the user. The processor 1301 is configured to: detect the running status of the second system by using the fourth system; when the fourth system detects that the second system is faulty, terminate running of the second system, and restore the second system by using the system image file; and if the restoration succeeds, start the restored second system; or if the restoration fails, start the third system.

Optionally, in another embodiment, a restoration instruction that is of the user and that is for the second system is received by using the user interface 1303. The processor 1301 is configured to restore the second system according to the received restoration instruction.

The processor 1301 may be configured to: according to the restoration instruction and by using the network interface 1304, obtain network connection information and connect to a network; download a system software restoration package by using the network; and restore the second system by using the system software restoration package.

The processor 1301 may be further configured to: restore the first system by using the system software restoration package; or restore the first system by using the restored second system.

Optionally, in another embodiment, the intelligent terminal 1300 may further include a system watchdog module and a system startup management module. The processor 1301 is configured to: detect the running status of the second system by using a watchdog counter of the system watchdog module; and when overflow occurs on the watchdog counter of the system watchdog module, send a reset signal to the system startup management module. After the system startup management module receives the reset signal, running of the second system is terminated, and the third system is started.

Optionally, in another embodiment, the processor 1301 may be further configured to restore the first system by using the second system or a system image file stored in the intelligent terminal 1300.

Optionally, in another embodiment, the processor 1301 is configured to simultaneously start the first system and the second system by using a virtualization technology.

Optionally, in another embodiment, multiple systems included in the intelligent terminal 1300 are obtained by means of virtualization configuration.

Optionally, the intelligent terminal 1300 in this embodiment of the present disclosure may be a mobile phone or a smartphone.

The intelligent terminal 1300 can implement each process implemented by the intelligent terminal in the foregoing method embodiment. To avoid repetition, details are not described herein again.

Figure 14:
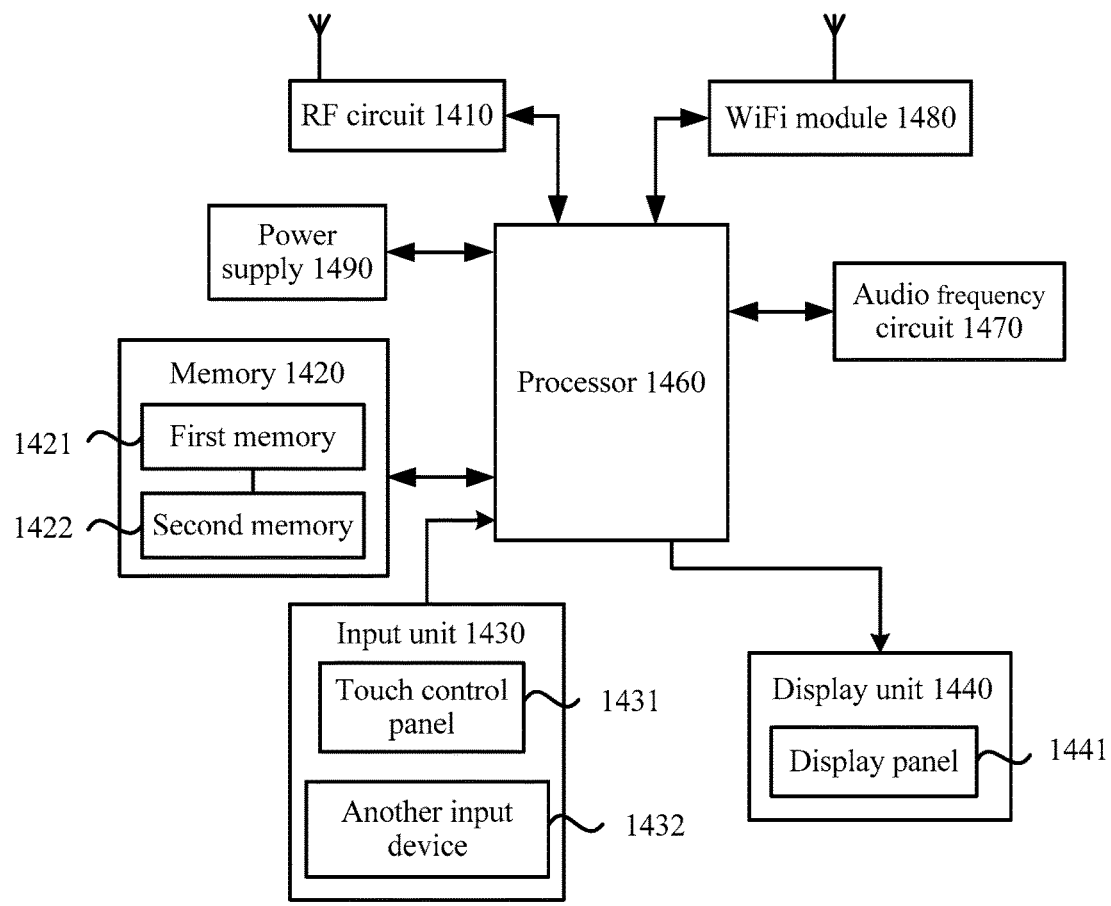
FIG. 14 is a schematic structural diagram of an intelligent terminal according to another embodiment of the present disclosure.

FIG. 14 is a schematic structural diagram of an intelligent terminal according to another embodiment of the present disclosure, the intelligent terminal 1400 in FIG. 14 may be a mobile phone (for example, a mobile phone or a smartphone), a personal digital assistant (PDA), or the like.

The intelligent terminal 1400 in FIG. 14 includes a radio frequency (RF) circuit 1410, a memory 1420, an input unit 1430, a display unit 1440, a processor 1460, an audio frequency circuit 1470, a Wi-Fi (Wireless Fidelity) module 1480, and a power supply 1490.

The input unit 1430 may be configured to: receive digit or character information entered by a user, and generate a signal input related to user settings and function control of the intelligent terminal 1400, in this embodiment of the present disclosure, the input unit 1430 may include a touch control panel 1431. The touch control panel 1431 is also referred to as a touchscreen, and can collect a touch operation of the user on or near the touch control panel 1431 (for example, an operation performed by the user on the touch control panel 1431 by using any proper object or accessory such as a finger or a stylus), and drive a corresponding connection apparatus according to a preset program. Optionally, the touch control panel 1431 may include two parts: a touch detection apparatus and a touch controller. The touch detection apparatus detects a touch position of the user, detects a signal obtained after a touch operation, and transfers the signal to the touch controller. The touch controller receives touch information from the touch detection apparatus, converts the touch information into coordinates of a touch point, and sends the coordinates of the touch point to the processor 1460. The touch controller can receive and execute a command sent by the processor 1460. In addition, the touch control panel 1431 may be implemented by using multiple types such as a resistive type, a capacitive type, an infrared ray, and a surface acoustic wave. In addition to the touch control panel 1431, the input unit 1430 may further include another input device 1432. The another input device 1432 may include but is not limited to one or more of a physical keyboard, a functional button (for example, a volume control button or a switch button), a trackball, a mouse, or an operating lever.

The display unit 1440 may be configured to display information entered by the user or information provided for the user, and various menu screens of the intelligent terminal 1400. The display unit 1440 may include a display panel 1441. Optionally, the display panel 1441 may be configured by using an LCD, an organic light-emitting diode (OLED), or a like form.

It should be noted that the touch control panel 1431 may cover the display panel 1441, to form a touch display screen. After detecting a touch operation on or near the touch display screen, the touch display screen transfers the touch operation information to the processor 1460 to determine a type of a touch event. Then, the processor 1460 provides a corresponding visual output on the touch display screen according to the type of the touch event.

The touch display screen includes an application program screen display area and a common control display area. A layout manner of the application program screen display area and the common control display area is not limited, and may be a layout manner in which the two display areas can be distinguished, for example, an up-and-down layout or a side-by-side layout. The application program screen display area may be used to display a screen of an application program. Each screen may include a screen element such as an icon of at least one application program and/or a widget desktop control. Alternatively, the application program screen display area may be an empty screen that does not include any content. The common control display area is used to display a frequently-used control, for example, an application program icon such as an icon of a settings button, an interface number, a scroll bar, or a phone book.

The processor 1460 is a control center of the intelligent terminal 1400, and is connected to all the parts of the entire intelligent terminal by using various interfaces and lines. By running or executing a software program and/or a module stored in a first memory 1421 and by invoking data stored in a second memory 1422, the processor 1460 performs various functions of the intelligent terminal 1400, and processes data, so as to perform overall monitoring on the intelligent terminal 1400. Optionally, the processor 1460 may include one or more processing units.

In this embodiment of the present disclosure, the intelligent terminal 1400 may include a first system and a second system. A function that can be implemented by the second system includes at least one of a call function or a short message service function, and a function that can be implemented by the first system includes the function that can be implemented by the second system. For example, the first system may be stored in the first memory 1421, and the second system may be stored in the second memory 1422. The second system may include an operating system pre-installed by a manufacturer. The first system may include an operating system pre-installed by the manufacturer or an operating system installed by the user by means of reinstallation by using a reinstallation package. By invoking a software program and/or a module and/or data stored in the memory 1420, the processor 1460 is configured to: simultaneously start the first system and the second system, where an operation screen of the first system is visible to the user, and an operation screen of the second system is invisible to the user; detect a running status of the first system; and when it is detected that the first system is faulty, terminate running of the first system, and switch to the operation screen of the second system.

In this embodiment of the present disclosure, the intelligent terminal includes the first system and the second system that simultaneously run. When the first system is faulty, the intelligent terminal can switch to the second system, and the second system provides the at least one of the call function or the short message service function, so as to ensure normal use of the intelligent terminal. In addition, because the second system and the first system simultaneously run, the system switching requires a relatively short time, so as to implement quick switching, and improve user experience.

It should be noted that the intelligent terminal 1400 can implement each process implemented by the intelligent terminal in the foregoing embodiment. To avoid repetition, details are not described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A system running method for an intelligent terminal comprising a first system, a second system, and a third system, the method comprising:
   starting the first system and the second system, wherein an operating screen of the first system is visible to a user, wherein an operation screen of the second system is invisible to the user, wherein a second function that is implementable by the second system comprises at least one of a call function or a short message service function, wherein a first function that is implementable by the first system comprises the function that is implementable by the second system, and wherein a third function that is implementable by the third system comprises at least one of the call function or the short message service function;
   detecting a running status of the first system;
   terminating running of the first system in response to the first system being faulty;
   switching to the operation screen of the second system in response to the first system being faulty;
   detecting a running status of the second system,
   terminating running of the second system in response to the second system being faulty; and
   starting the third system in response to the second system being faulty.

2. The method according to claim 1, further comprising:
   storing a system image file of the second system;
   restoring the second system using the system image file in response to the second system being faulty; and
   starting a restored second system in response to successfully restoring the second system.

3. The method according to claim 2, further comprising starting the third system in response to unsuccessfully restoring the second system.

4. The method according to claim 1, wherein the first system comprises at least one of system software or an application program installed by the user.

5. The method according to claim 1, further comprising:
   receiving a restoration instruction from the user for the second system; and
   restoring the second system according to the restoration instruction.

6. The method according to claim 5, wherein the third function that is implementable by the third system further comprises a network connection function, and wherein restoring the second system according to the restoration instruction comprises:
   obtaining network connection information according to the restoration instruction;
   connecting to a network according to the restoration instruction;
   downloading a system software restoration package using the network, and
   restoring the second system using the system software restoration package.

7. The method according to claim 6, further comprising restoring the first system using the system software restoration package or a restored second system.

8. The method according to claim 1, wherein detecting the running status of the second system comprises detecting the running status of the second system using a watchdog counter, and wherein the second system is terminated and the third system is started in response to a reset signal based on the watchdog counter.

9. The method according to claim 1, further comprising restoring the first system using the second system or a system image file stored in the intelligent terminal.

10. The method according to claim 1, wherein the first system and the second system are simultaneously started using a virtualization technology.

11. The method according to claim 1, wherein the first system, the second system, and the third system comprised in the intelligent terminal are obtained using a virtualization configuration.

12. An intelligent terminal, comprising:
   a second system, wherein a second function that is implementable by the second system comprises at least one of a call function or a short message service function;

a first system, wherein a first function that is implementable by the first system comprises the function that is implementable by the second system;

a third system, wherein a third function that is implementable by the third system comprises at least one of the call function or the short message service function;

a memory configured to store functions; and a processor coupled to the memory and configured to execute the instructions, which cause the processor to be configured to:

start the first system and the second system, wherein an operation screen of the first system is visible to a user, and wherein an operation screen of the second system is invisible to the user;

detect a running status of the first system;

terminate running of the first system in response to the first system being faulty switch to the operation screen of the second system in response to the first system being faulty;

detect a running status of the second system;

terminate running of the second system in response to the second system being faulty; and starting the third system in response to the second system being faulty.

13. The intelligent terminal according to claim 12, wherein the instructions further cause the processor to be configured to:

store a system image file of the second system;

restore the second system using the system image file in response to the second system being faulty; and start a restored second system in response to successfully restoring the second system.

14. The intelligent terminal according to claim 13, wherein the instructions further cause the processor to be configured to start the third system in response to unsuccessfully restoring the second system.

15. The intelligent terminal according to claim 12, wherein the first system comprises at least one of system software or an application program installed by the user.

16. The intelligent terminal according to claim 12, wherein the instructions further cause the processor to be configured to:

receive a restoration instruction from the user for the second system; and restore the second system according to the restoration instruction.

17. The intelligent terminal according to claim 16, wherein the third function that is implementable by the third system further comprises a network connection function, and wherein the instructions further cause the processor to be configured to:

obtain network connection information according to the restoration instruction;

connect to a network according to the restoration instruction;

download a system software restoration package using the network, and restore the second system using the system software restoration package.

18. The intelligent terminal according to claim 17, wherein the instructions further cause the processor to be configured to restore the first system using the system software restoration package or a restored second system.

19. The intelligent terminal according to claim 12, wherein the instructions further cause the processor to be configured to detect the running status of the second system using a watchdog counter and wherein running of the second system and the third system are terminated in response to a reset signal based on the watchdog counter.

20. The intelligent terminal according to claim 12, wherein the instructions further cause the processor to be configured to restore the first system using the second system or a system image file stored in the intelligent terminal.

21. The intelligent terminal according to claim 12, wherein the first system and the second system are simultaneously started using a virtualization technology.

22. The intelligent terminal according to claim 12, wherein the first system, the second system, and the third system comprised in the intelligent terminal are obtained using a virtualization configuration.

* * * * *